US012480336B2

(12) United States Patent
Chen

(10) Patent No.: US 12,480,336 B2
(45) Date of Patent: Nov. 25, 2025

(54) DELAYED UNLOCKING PUSH-DOWN TYPE EMERGENCY DOOR-LOCKING DEVICE

(71) Applicant: Shanghai Ming Wei Hardware Co., Ltd., Shanghai (CN)

(72) Inventor: Jung-Chung Chen, Shanghai (CN)

(73) Assignee: Shanghai Ming Wei Hardware Co., Ltd., Shanghai (CN)

( * ) Notice: Subject to any disclaimer, the term of this patent is extended or adjusted under 35 U.S.C. 154(b) by 67 days.

(21) Appl. No.: 18/627,646

(22) Filed: Apr. 5, 2024

(65) Prior Publication Data

US 2025/0198197 A1 Jun. 19, 2025

(30) Foreign Application Priority Data

Dec. 14, 2023 (TW) ................................ 112213653

(51) Int. Cl.

*E05B 45/08* (2006.01)
*E05B 47/00* (2006.01)
*E05B 65/10* (2006.01)
*E05B 45/06* (2006.01)

(52) U.S. Cl.

CPC .......... *E05B 45/08* (2013.01); *E05B 47/0002* (2013.01); *E05B 65/1066* (2013.01); *E05B 65/108* (2013.01); *E05B 2045/0615* (2013.01); *E05B 2045/065* (2013.01); *E05B 2045/069* (2013.01); *E05B 2047/0016* (2013.01); *E05B 2047/0054* (2013.01)

(58) Field of Classification Search

CPC .. E05B 45/08; E05B 47/0002; E05B 65/1066; E05B 65/108; E05B 2045/0615; E05B 2045/065; E05B 2045/069; E05B 2047/0016; E05B 2047/0054

See application file for complete search history.

(56) References Cited

U.S. PATENT DOCUMENTS 4,640,110 A * 2/1987 Fish ........................ E05B 37/16
70/214
4,763,937 A * 8/1988 Sittnick, Jr. ........... E05B 65/108
361/170
5,011,199 A * 4/1991 Lowe .................. E05B 47/0002
292/DIG. 65

(Continued)

*Primary Examiner* — Mark A Williams
(74) *Attorney, Agent, or Firm* — MUNCY, GEISSLER, OLDS & LOWE, P.C.

(57) ABSTRACT

A delayed unlocking push-down type emergency door-locking device includes a main lock seat, a secondary lock seat, a push-down type handle assembly, a position-sensing module and a timing electromagnetic traction assembly. The push-down type handle assembly is configured for moving along a driving path from a locking position toward an unlocking position, thereby at least one of locking element of the main lock seat is separated from a locking groove to unlock. A stopper is disposed at the secondary lock seat, configured for moving between a stop position and an avoidance position. The timing electromagnetic traction assembly is configured for counting time upon when the position-sensing module detects the push-down type handle assembly is separated from the locking position, and for pulling the stopper from the stop position to the avoidance position after delaying a predetermined delay time to the unlocking position for delaying.

11 Claims, 10 Drawing Sheets

(56) References Cited

U.S. PATENT DOCUMENTS

| | | | | |
|---|---|---|---|---|
| 6,104,594 | A * | 8/2000 | Frolov | E05B 65/1073 361/139 |
| 2003/0182863 | A1 * | 10/2003 | Mejean | E05B 81/66 49/26 |
| 2006/0082162 | A1 * | 4/2006 | Escobar | E05B 47/023 292/201 |
| 2011/0047876 | A1 * | 3/2011 | Houser | A47K 5/06 49/70 |
| 2015/0184426 | A1 * | 7/2015 | Arlinghaus | E05B 65/108 292/138 |
| 2021/0381278 | A1 * | 12/2021 | Lin | E05B 65/108 |
| 2023/0008687 | A1 * | 1/2023 | Hasenstein | E05B 47/0038 |
| 2023/0090037 | A1 * | 3/2023 | Denison | E05B 47/0603 70/266 |

* cited by examiner

DELAYED UNLOCKING PUSH-DOWN TYPE EMERGENCY DOOR-LOCKING DEVICE

This application claims the benefit of Taiwan Patent Application Serial No. 112213653, filed on Dec. 14, 2023, the subject matter of which is incorporated herein by reference.

BACKGROUND OF THE INVENTION

(1) Field of the Invention

The invention relates to an emergency door-locking device, and more particularly to a push-down type emergency door-locking device that can be delayed unlocking while a handle is under a push-down operation.

(2) Description of the Prior Art

In order for people to quickly escape from the building when an emergency disaster occurs, an emergency door and an emergency door lock are usually disposed at the escape exit. Due to the need for escape, it is often necessary to allow people in the room to quickly unlock and escape directly. However, as far as specific buildings are concerned, due to certain regulatory needs, people inside the building must meet certain conditions before they can be allowed to leave.

For example, when the interior of the building is a business space in a shopping mall, people inside the building must firstly complete the checkout actions before they can be allowed to leave. If some unscrupulous consumers leave through the emergency door without checking out after taking the goods, it will cause unreasonable property losses to the shopping mall.

In the prior art, in order to prevent the occurrence of this situation and take into account the need for escape, various countries have formulated corresponding fire regulations to regulate the allowable delayed unlocking time. In practice, according to the fire regulations of different countries, the allowable delayed unlocking time is usually between 15 and 30 seconds. In the meanwhile, it is usually used in conjunction with a buzzer, so that shopping mall operators have extra time to respond and dispatch personnel immediately before the door-locking device is unlocked.

Even so, there are currently only flat-push type emergency door-locking devices with delayed unlocking function on the market but no push-down type emergency door-locking devices. The main reason why it has not been used in push-down type emergency door-locking devices is that for push-down type emergency door-locking devices, since the main lock seat is usually installed with a driving component to drive the tongue to open and close the lock, the remaining internal space of the main lock seat is limited. In addition, to meet different internal spaces at different main lock seats, for choosing to use the delayed unlocking function in push-down type emergency door-locking devices, it is usually necessary to install different delayed unlocking function components (such as sensors, stoppers and electromagnetic traction devices) for different main lock seats, or choose to install the delayed unlocking function components outside the corresponding lock seats and relevant strong housing for protection.

If installing different delayed unlocking function components for different main lock seats is the choice, then it will inevitably cause the problem of increased preparation and installation costs of these delayed unlocking function components. On the other hand, if installing the delayed unlocking function components outside the main lock seats is the choice, then, since corresponding strong enough shells are needed to provide protection, it will also cause another increase in the preparation and installation costs of these delayed unlocking function components.

SUMMARY OF THE INVENTION

In view of the fact that there are currently only flat-push type emergency door-locking devices with delayed unlocking function but no push-down type emergency door-locking devices, in the prior art, whether you choose to install different delayed unlocking function components for different main lock seats, or choose to install the delayed unlocking function components outside the main lock seats, additional expenses for the preparation of delayed unlocking function components are inevitable.

Accordingly, it is an object of the present invention to provide a delayed unlocking push-down type emergency door-locking device that can utilize a spare room in a secondary lock seat to install components for delayed unlocking function to solve the above problems. On the basis of the above, in the present invention, a delayed unlocking push-down type emergency door-locking device (the emergency door-locking device hereinafter) is disposed at a door board, and the door board includes a locking side neighboring to a locking groove. The emergency door-locking device includes a main lock seat, a secondary lock seat, a push-down type handle assembly, a position-sensing module and a timing electromagnetic traction assembly.

The main lock seat, disposed by neighboring to the locking side of the door board, has a locking element. The secondary lock seat is disposed by being away from the locking side of the door board than the main lock seat. The push-down type handle assembly includes a first handle, a second handle and a push-down horizontal bar. The first handle, connected pivotally with the secondary lock seat, is configured for being controlled to move pivotally toward an unlocking position along a driving path from a locking position. The second handle, connected pivotally with the main lock seat, is configured for being controlled to move with the first handle along the driving path. While at the locking position, the locking element is buckled with the locking groove. While at the unlocking position, the locking element is separated from the locking groove. The push-down horizontal bar bridges the first handle and the second handle so as to have the second handle and the first handle to be connected in a coherent manner.

A stopper is moveably disposed at the secondary lock seat, controlled for moving between a stop position and an avoidance position; wherein the stop position is for blocking the driving path, and the avoidance position is for avoiding the driving path. The position-sensing module, disposed at the secondary lock seat, is configured for sensing whether or not the first handle has been separated from the locking position, and transmitting an unlocking-triggering signal if positive. A timing electromagnetic traction assembly is disposed at the secondary lock seat and includes a timing controller and an electromagnetic traction mechanism.

The timing controller is electrically connected with the position-sensing module, and is configured for counting time after the unlocking-triggering signal is received in a function-on state, and is configured for issuing a stopper pulling signal after the counted time reaches a predetermined delay time. The electromagnetic traction mechanism, electrically connected with the timing controller and connected with the stopper, pulls the stopper from the stop position to the avoidance position after the stopper pulling signal is received, thereby the second handle moves along the driving path to the unlocking position to delay unlocking.

In one embodiment of the present invention, preferably, the first handle can include a first drive portion and a first operation portion. The first drive portion is disposed inside the secondary lock seat. The first operation portion is extended out of the secondary lock seat from the first drive portion, and connected fixedly with the push-down horizontal bar. The second handle can include a second drive portion and a second operation portion. The second drive portion is disposed inside the main lock seat. The second operation portion is extended out of the main lock seat from the second drive portion, and connected fixedly with the push-down horizontal bar. The stopper includes an avoidance groove, and the stopper allows the first handle moving through the avoidance groove and along the driving path when the stopper is located at the avoidance position. The position-sensing module includes a first micro-switch sensor for generating the unlocking-triggering signal upon when it is detected that the first handle is separated from the locking position.

The electromagnetic traction mechanism includes an electromagnet, for providing a magnetic force that pulls the stopper from the stop position to the avoidance position after the stopper pulling signal is received, thereby the second handle moves along the driving path to the unlocking position for unlocking. The timing controller includes a circuit board, a controller and a timer. The circuit board is disposed inside the secondary lock seat. The controller is disposed at the circuit board, electrically connected with the position-sensing module, and configured for generating a timing signal after the unlocking-triggering signal is received in the function-on state. The timer, electrically connected with the controller, is configured for counting time after the timing signal is received in the function-on state, and is configured for issuing a timing-off signal after the counted time reaches the predetermined delay time, thereby the controller issues the stopper pulling signal.

Preferably, the emergency door-locking device can further include a buzzer, electrically connected with the controller, the controller further generating an alarm signal after the unlocking-triggering signal is received in the function-on state, the controller transmitting the alarm signal to the buzzer to enable the buzzer to issue an alarm.

The emergency door-locking device further includes a delayed unlocking function switch lock and an on/off position-detecting module. The delayed unlocking function switch lock, disposed inside the secondary lock seat, is driven by a key to move between a function-enable position and a function-disable position. The on/off position-detecting module is disposed at the secondary lock seat, electrically connected with the controller, and configured for transmitting a function-on signal to the controller for the controller to enter the function-on state upon when the delayed unlocking function switch lock is detected to be at the function-enable position and for transmitting a function-off signal to the controller for the controller to enter a function-off state upon when the delayed unlocking function switch lock is detected to be at the function-disable position, and then transmitting an alarm clear signal to the buzzer for terminating the alarm.

The on/off position-detecting module includes a second micro-switch sensor for detecting that the delayed unlocking function switch lock is at the function-enable position or the function-disable position. The emergency door-locking device further includes a lever, disposed inside the secondary lock seat and driven by the delayed unlocking function switch lock; wherein, upon when the delayed unlocking function switch lock is at the function-enable position, the second micro-switch sensor is triggered to have the second micro-switch sensor to detect that the delayed unlocking function switch lock is at the function-enable position.

As stated above, since the delayed unlocking push-down type emergency door-locking device provided in the present invention utilizes the position-sensing module disposed inside the secondary lock seat to sense if the first handle is separated from the locking position, such that the delayed unlocking function is initiated. After a predetermined delay time is reached, the electromagnetic traction mechanism pulls the stopper from the stop position to the avoidance position, thereby the push-down type handle assembly continues moving along the driving path to the unlocking position to delay unlocking.

In addition, since all the elements related to the aforesaid delayed unlocking means (including the stopper, the position-sensing module and the timing electromagnetic traction assembly) are all disposed inside the secondary lock seat, and all the mechanisms related to the locking/unlocking are also disposed inside the main lock seat, thus functions of automatic sensing and delayed unlocking can be fulfilled without changing internal locking/unlocking mechanisms of the main lock seat. Accordingly, the applications can be common for a variety of existing push-down emergency door-locking devices, and thus the push-down emergency door-locking device originally without the delayed unlocking function can be upgraded to have the delayed unlocking function. Thereby, preparation and installation costs of the components related to the sensing and delayed unlocking can be substantially reduced.

All these objects are achieved by the delayed unlocking push-down type emergency door-locking device described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a delayed unlocking push-down type emergency door-locking device. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
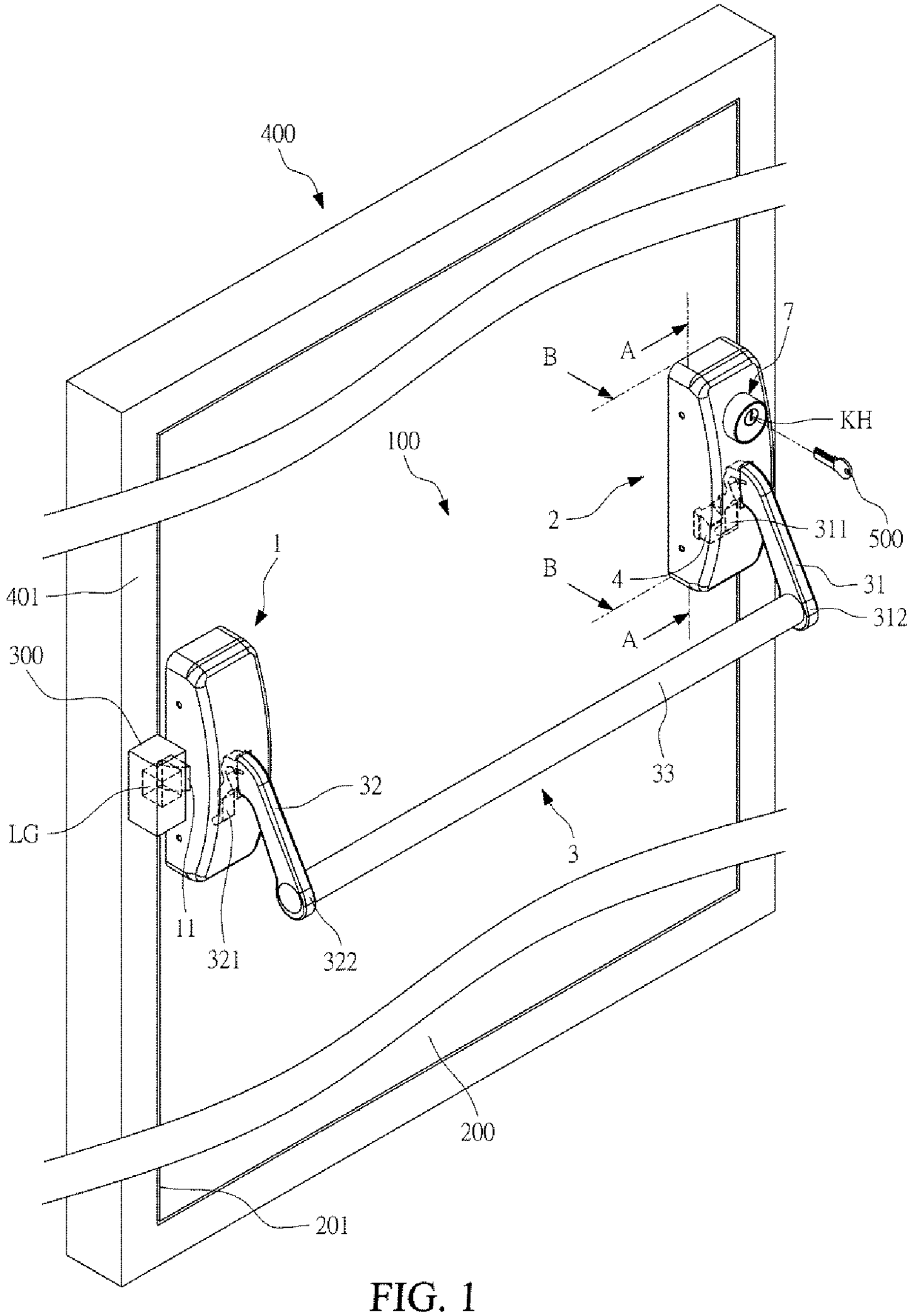
FIG. 1 demonstrates schematically a preferred embodiment of the delayed unlocking push-down type emergency door-locking device in accordance with the present invention, installed behind an emergency door.
Figure 2:
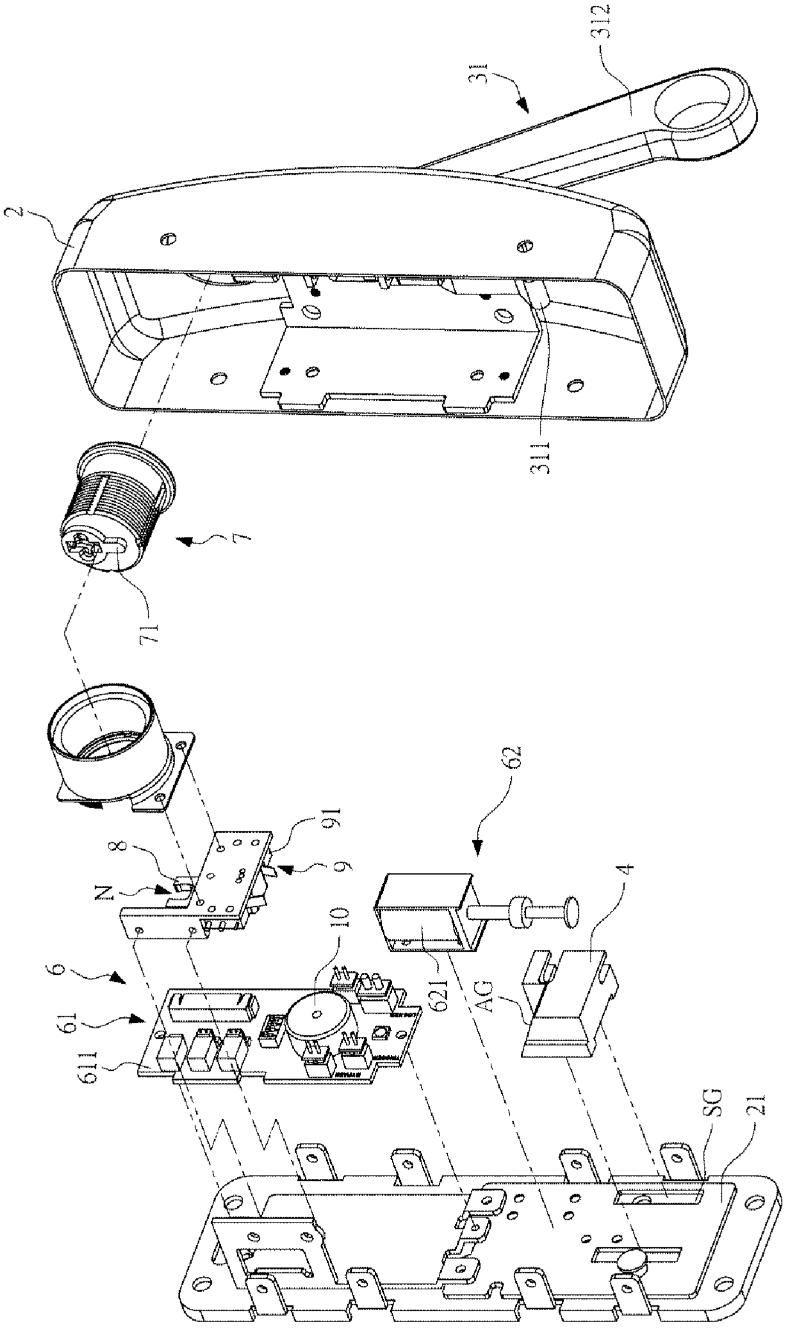
FIG. 2 is a schematic exploded view of the delayed unlocking push-down type emergency door-locking device of FIG. 1.
Figure 3:
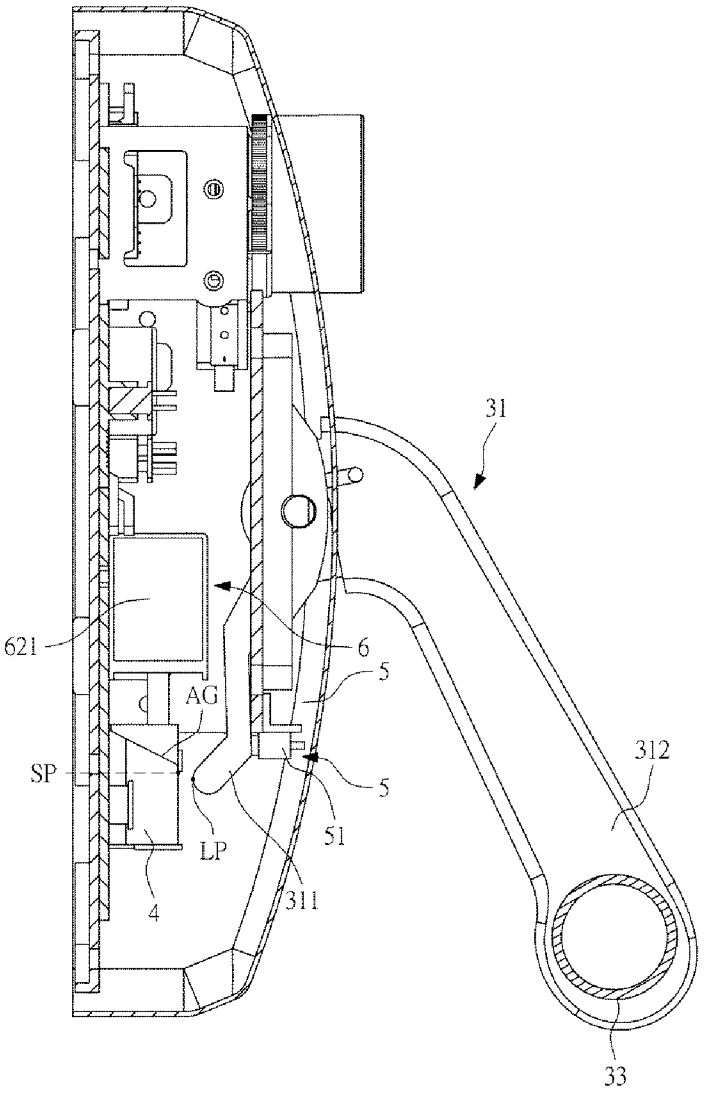
FIG. 3 is a schematic cross-sectional view of the delayed unlocking push-down type emergency door-locking device along line A-A of FIG. 1.
Figure 4:
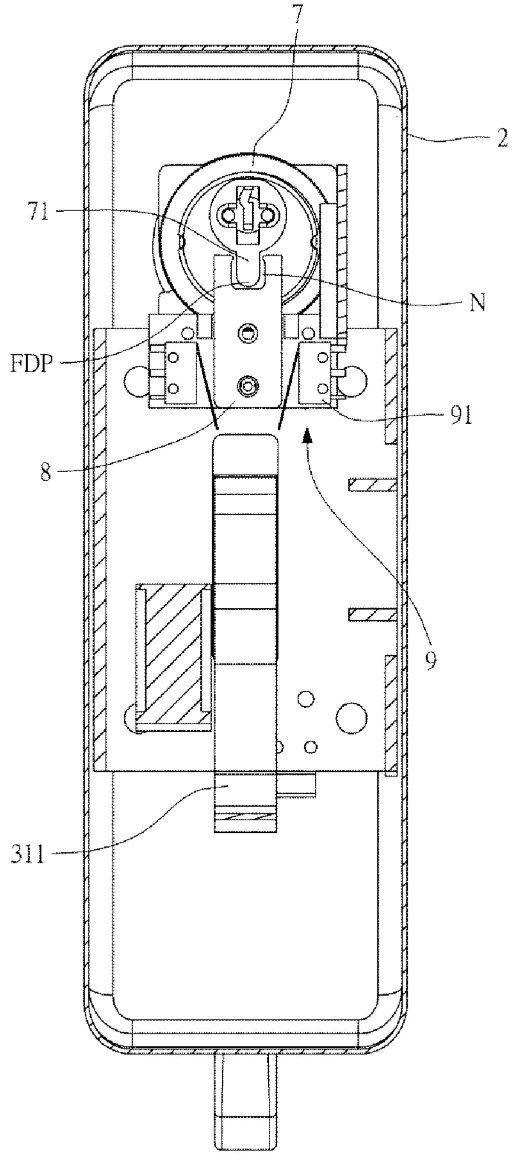
FIG. 4 is a schematic cross-sectional view of the delayed unlocking push-down type emergency door-locking device along line B-B of FIG. 1.
Figure 5:
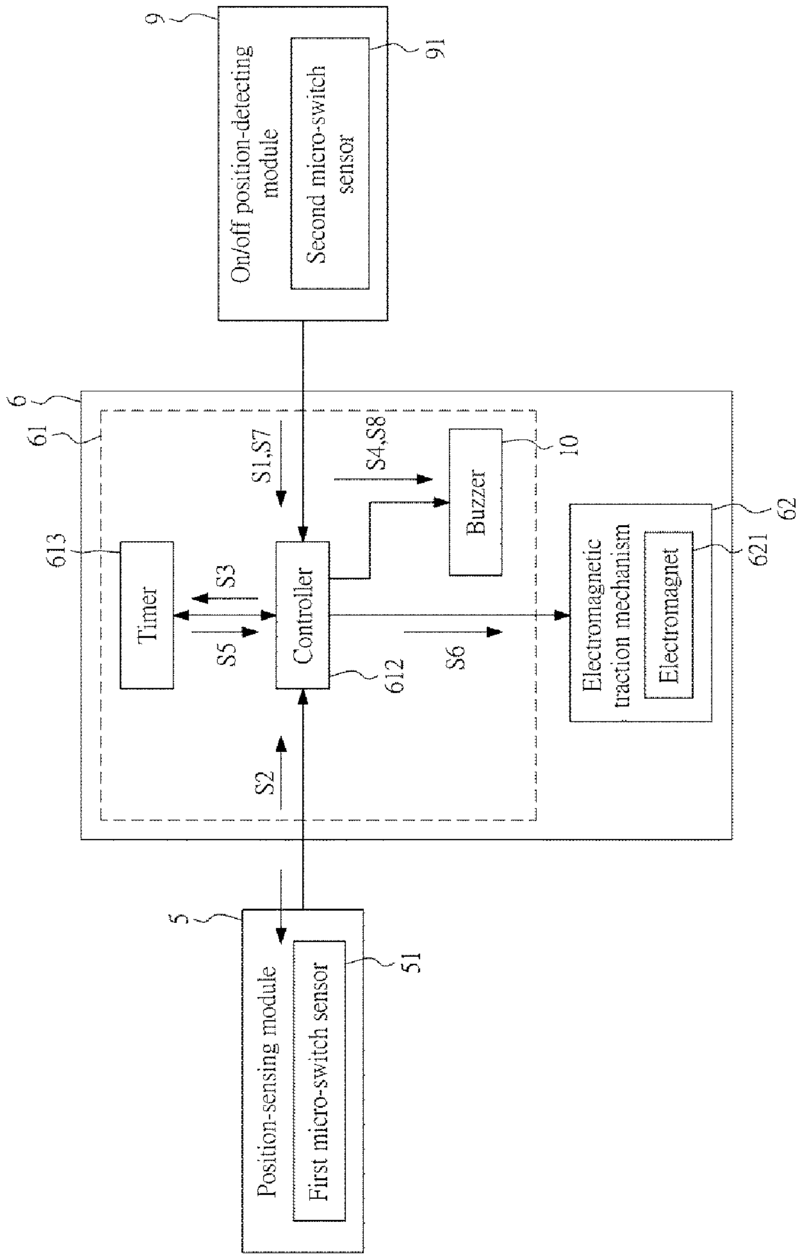
FIG. 5 is a schematic block diagram of internal main circuits of the delayed unlocking push-down type emergency door-locking device of FIG. 1.

Refer to FIG. 1 to FIG. 5; where FIG. 1 demonstrates schematically a preferred embodiment of the delayed unlocking push-down type emergency door-locking device in accordance with the present invention, installed behind an emergency door, FIG. 2 is a schematic exploded view of the delayed unlocking push-down type emergency door-locking device of FIG. 1, FIG. 3 is a schematic cross-sectional view of the delayed unlocking push-down type emergency door-locking device along line A-A of FIG. 1, FIG. 4 is a schematic cross-sectional view of the delayed unlocking push-down type emergency door-locking device along line B-B of FIG. 1, and FIG. 5 is a schematic block diagram of internal main circuits of the delayed unlocking push-down type emergency door-locking device of FIG. 1.

As shown from FIG. 1 to FIG. 5, a delayed unlocking push-down type emergency door-locking device 100 (the emergency door-locking device hereinafter) is disposed at a door board 200. The door board 200 includes a locking side 201 neighboring to a locking groove LG. The locking groove LG can be provided to a door-frame lock seat 300, and the door-frame lock seat 300 is fixed to an indoor side 401 of a door frame 400.

The emergency door-locking device 100 includes a main lock seat 1, a secondary lock seat 2, a push-down type handle assembly 3, a stopper 4, a position-sensing module 5, a timing electromagnetic traction assembly 6, a delayed unlocking function switch lock 7, a lever 8, an on/off position-detecting module 9 and a buzzer 10. The main lock seat 1 is disposed by being neighboring to the locking side 201 of the door board 200, and has at least one locking element (only one locking element 11 in this embodiment). The number of the locking elements can be determined according to different types of locks, such as single locking point, double locking point and three locking point, and can be 1, 2 or 3, and the locking element 11 can be a tongue, a latch or a crash bar. The secondary lock seat 2 is disposed by being farther away from the locking side 201 than the main lock seat 1, and includes a secondary lock seat base 21. The secondary lock seat base 21 includes at least one stroke limit groove. The present embodiment includes two stroke limit grooves (FIG. 2 only shows one of the stroke limit grooves SG). The push-down type handle assembly 3 includes a first handle 31, a second handle 32 and a push-down horizontal bar 33.

The first handle 31, connected pivotally with the secondary lock seat 2, can include a first drive portion 311 and a first operation portion 312. The first drive portion 311 is disposed inside the secondary lock seat 2. The first operation portion 312 is extended out of the secondary lock seat 2 from the first drive portion 311, and connected fixedly with the push-down horizontal bar 33. The second handle 32, connected pivotally with the main lock seat 1, can include a second drive portion 321 and a second operation portion 322. The second drive portion 321 is disposed inside the main lock seat 1. The second operation portion 322 is extended out of the main lock seat 1 from the second drive portion 321, and connected fixedly with the push-down horizontal bar 33.

The second drive portion 321 can be used to drive the unlocking mechanism so as to control the locking element 11 to protrude or retrieve. Since the unlocking mechanism is already one of popular driving mechanisms in the art (definitely modified to meet versatile locks, and generally consisted of rocker arms, linkages and resilient elements), not within the scope of this invention, thus detail thereabout would be omitted herein. The push-down horizontal bar 33 is to bridge fixedly the first operation portion 312 of the first handle 31 and the second operation portion 322 of the second handle 32, such that the second handle 32 and the first handle 31 can be connected in a coherent manner.

While in a locking state, since the first drive portion 311 and the second drive portion 321 are both disposed at a locking position LP, thus the unlocking mechanism can have the locking element 11 fitted into the locking groove LG to perform the locking. The stopper 4 is moveably disposed at a stroke limit groove SG and includes an avoidance groove AG. The stroke limit groove SG is used to limit a pulling stroke of the stopper 4, thereby the stopper 4 is limited to move between a stop position SP and an avoidance position AP shown in FIG. 10. While the stopper 4 is located at the avoidance position AP, the stopper 4 allows the first handle 3 moving through the avoidance groove AG and along the driving path DP shown in FIG. 10.

The position-sensing module 5, disposed inside the secondary lock seat 2, can include a first micro-switch sensor 51. While in the locking state, the first drive portion 311 would depress the first micro-switch sensor 51. The first micro-switch sensor 51 can be one of a metal contact type micro-switch, a capacitive sensing type micro-switch, an inductive sensing type micro-switch or a piezoresistive sensing type micro-switch for sensing whether or not the first micro-switch sensor 51 is separated from the first drive portion 311, or sensing whether or not the first micro-switch sensor 51 changes a pressing pressure between the first micro-switch sensor 51 and the first drive portion 311. The structure and working principle of the micro-switch are not within the scope of this invention, thus detail thereabout would be omitted herein.

The timing electromagnetic traction assembly 6 is disposed at the secondary lock seat 2 and includes a timing controller 61 and an electromagnetic traction mechanism 62. The timing controller 61 is electrically connected with the position-sensing module 5 and can include a circuit board 611, a controller 612 and a timer 613. The circuit board 611 is disposed inside the secondary lock seat 2. The controller 612 and the timer 613 are disposed at the circuit board 611, and the controller 612 is electrically connected with the first micro-switch sensor 51 of the position-sensing module 5.

The electromagnetic traction mechanism 62 is electrically connected with the timing controller 61, and is connected to the stopper 4, and can include an electromagnet 621.

The delayed unlocking function switch lock 7 is extended out of the secondary lock seat 2 from an inside of the secondary lock seat 2, and furnished with a key hole KH and a protrusion 71. The lever 8, disposed inside the secondary lock seat 2, is furnished with a concave edge N for receiving the protrusion 71.

The on/off position-detecting module 9, disposed inside the secondary lock seat 2, includes a second micro-switch sensor 91. The second micro-switch sensor 91 is electrically connected with the controller 612. While the protrusion 71 of the delayed unlocking function switch lock 7 is disposed at a function-disable position FDP (as shown in FIG. 4), the lever 8 does not contact the second micro-switch sensor 91, and thus the controller 612 of the emergency door-locking device 100 is in a (delayed unlocking) function-off state. The buzzer 10 is disposed at the circuit board 611 and electrically connected with the controller 612.

The second micro-switch sensor 91 can be one of a metal contact type micro-switch, a capacitive sensing type micro-switch, an inductive sensing type micro-switch or a piezoresistive sensing type micro-switch for sensing whether or not the second micro-switch sensor 91 contacts the lever 8, or sensing whether or not the second micro-switch sensor 91 changes a pressing pressure between the second micro-switch sensor 91 and the lever 8. The structure and working principle of the micro-switch are not within the scope of this invention, thus detail thereabout would be omitted herein.

Figure 6:
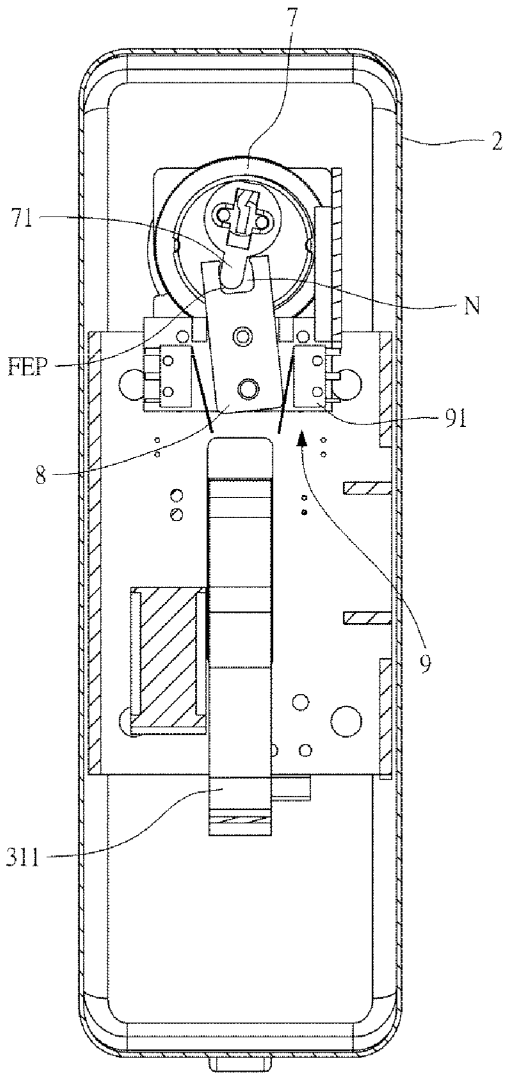
FIG. 6 illustrates schematically the position relationship diagram of partial components of the delayed unlocking push-down type emergency door-locking device of FIG. 1 at a (delayed unlocking) function-on state.

Referring to FIG. 6, the position relationship diagram of partial components of the delayed unlocking push-down type emergency door-locking device of FIG. 1 at a (delayed unlocking) function-on state is illustrated schematically. In the meanwhile, please refer back to FIG. 1 and FIG. 2.

As shown in FIG. 6, while a key 500 is inserted into the key hole KH by a manager to rotate the delayed unlocking function switch lock 7, the protrusion 71 of the delayed unlocking function switch lock 7 would be switched to a function-enable position FEP from the function-disable position FDP shown in FIG. 4. At this time, the protrusion 71 can rotate the lever 8 to touch the second micro-switch sensor 91, so that the on/off position-detecting module 9 can detect that the protrusion 71 of the delayed unlocking function switch lock 7 is at the function-enable position FEP. Then, a function-on signal S1 would be transmitted to the controller 612 for the controller 612 of the emergency door-locking device 100 to enter a (delayed unlocking) function-on state.

Figure 7:
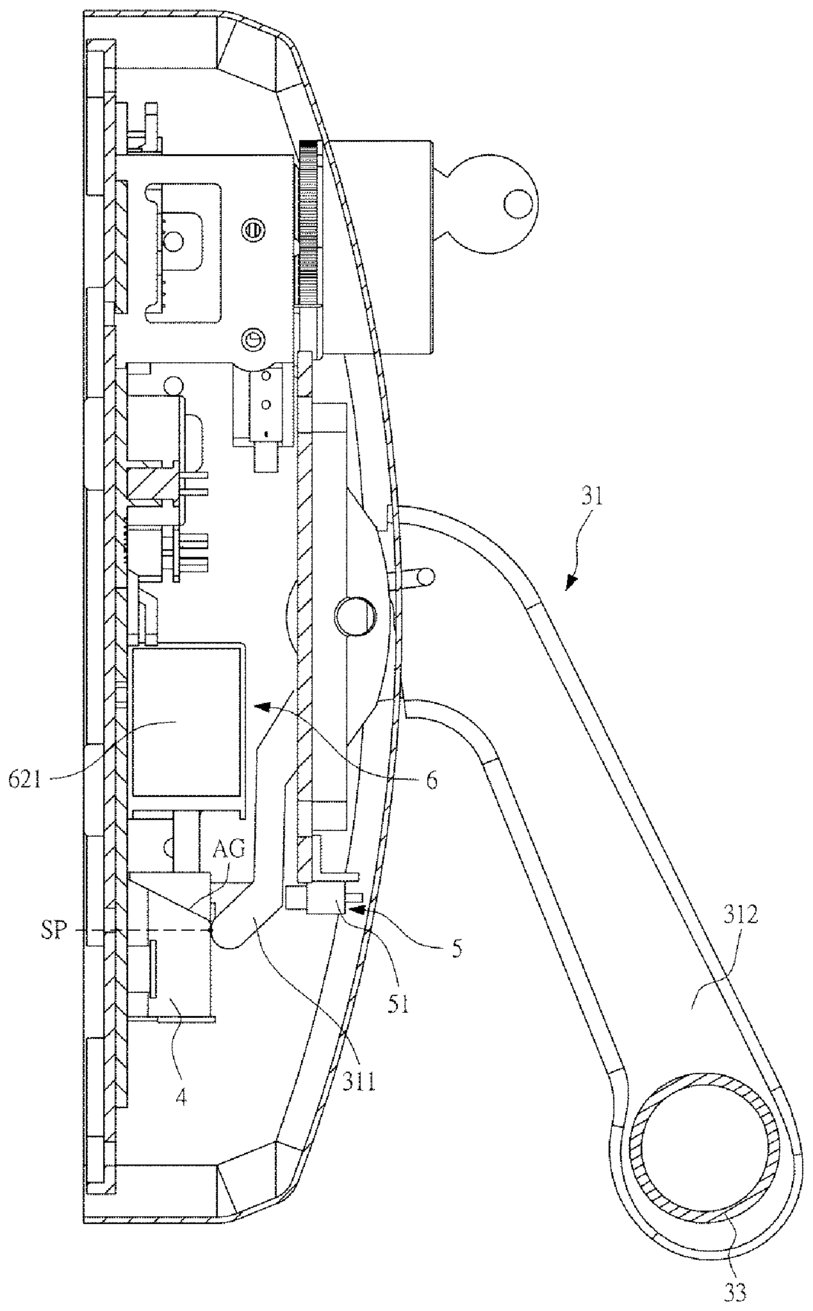
FIG. 7 illustrates schematically the position relationship diagram of partial components of the delayed unlocking push-down type emergency door-locking device of FIG. 1 when the handle is pushed down by an operator.
Figure 8:
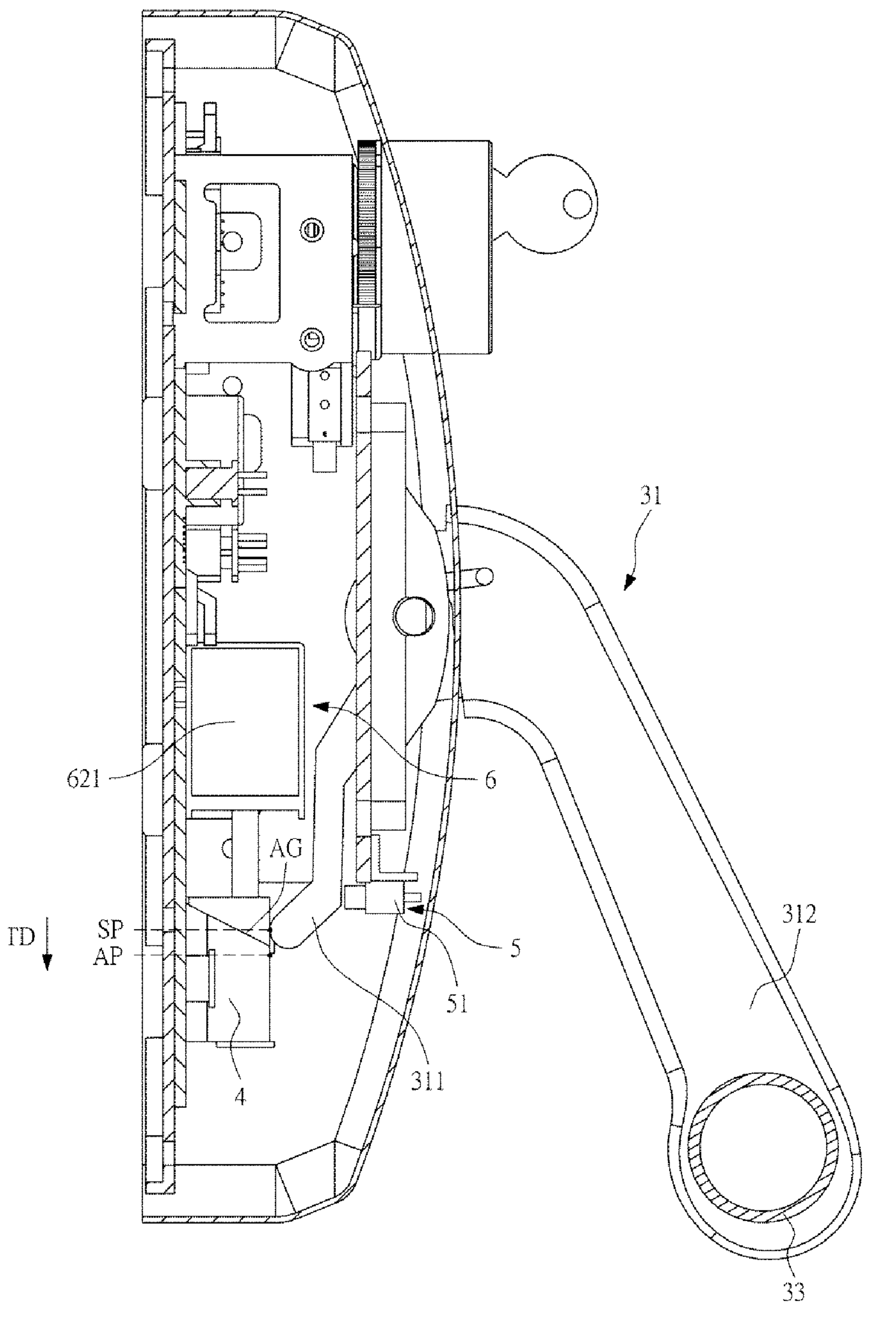
FIG. 8 illustrates schematically the position relationship diagram of partial components of the delayed unlocking push-down type emergency door-locking device of FIG. 1 when the stopper moves to the avoidance position after the counted time reaches the predetermined delay time.
Figure 9:
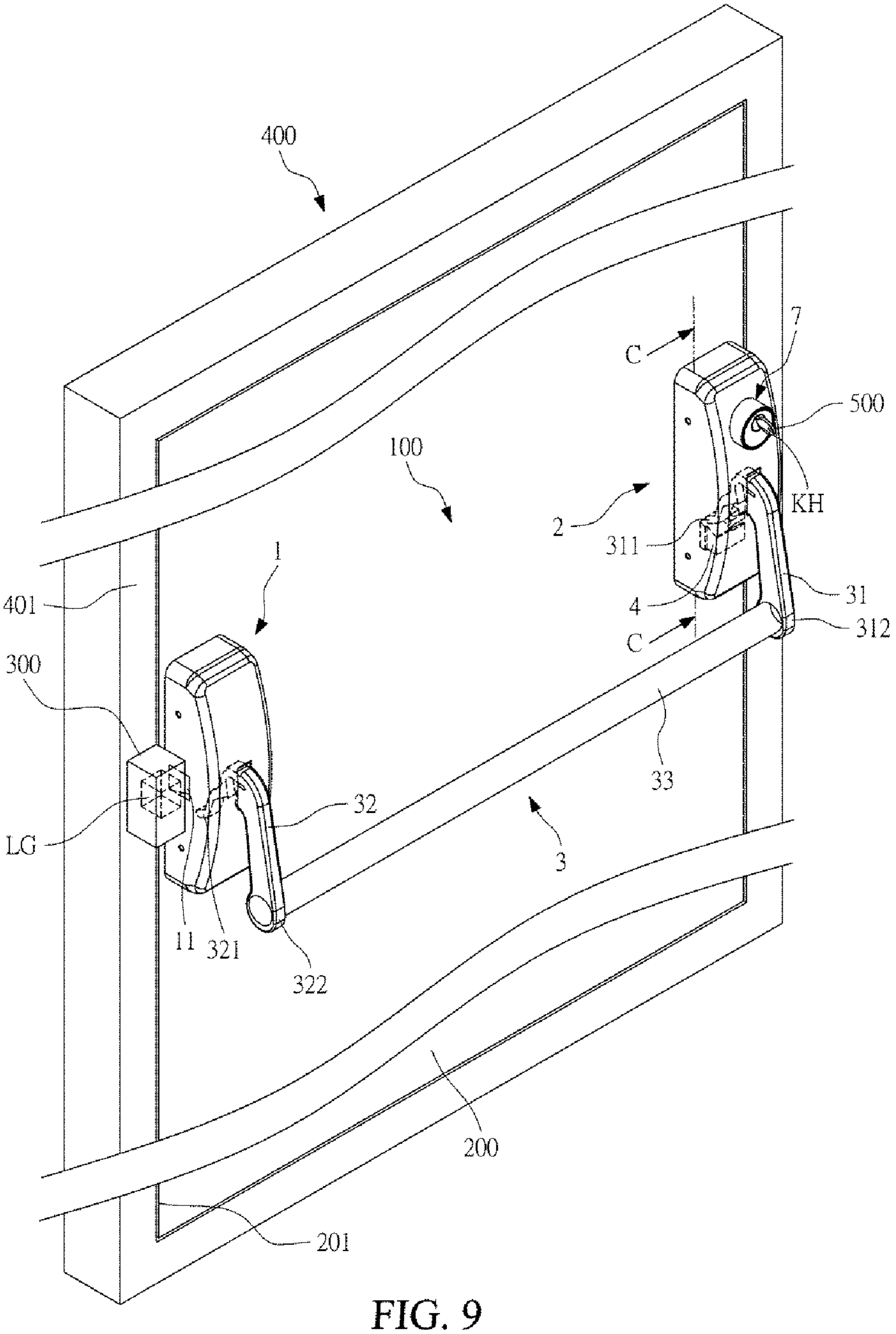
FIG. 9 illustrates schematically the state of the delayed unlocking push-down type emergency door-locking device of FIG. 1 at a controlled unlock state after being assembled behind the emergency door.
Figure 10:
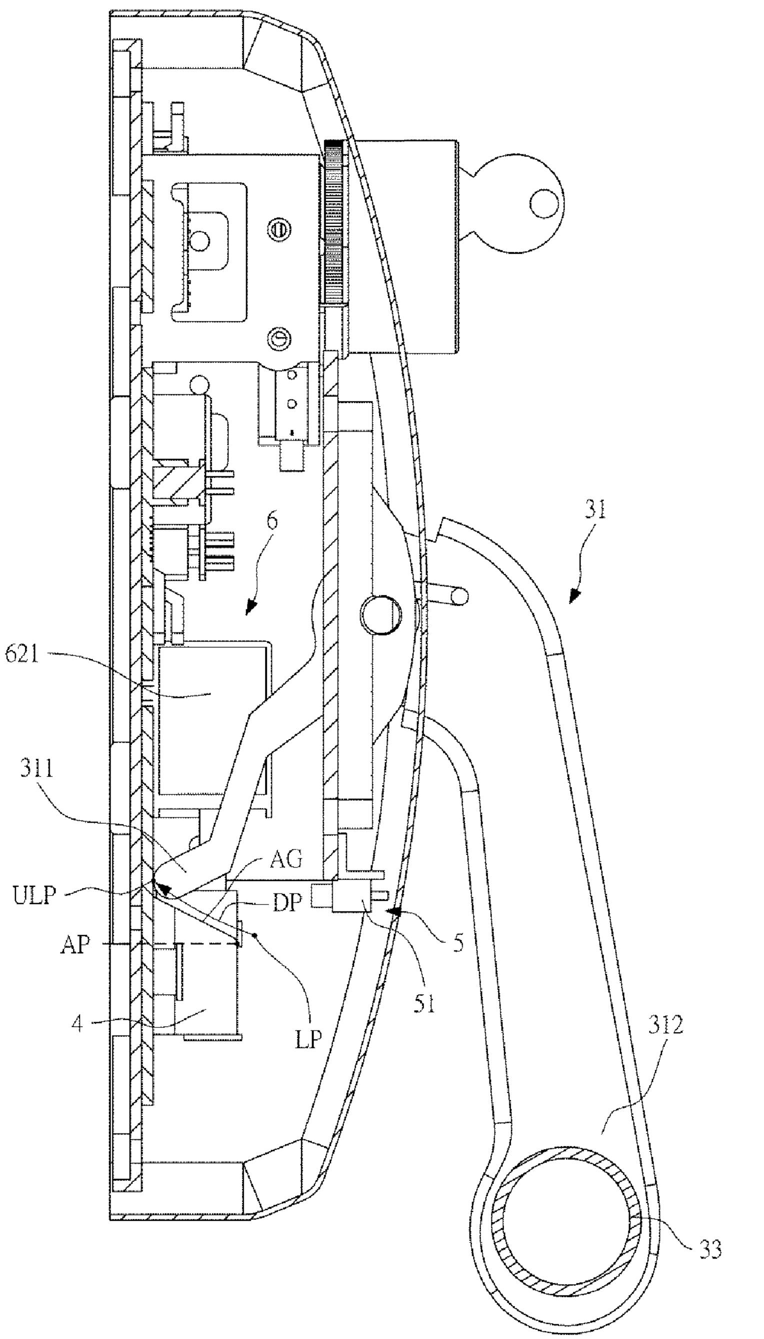
FIG. 10 is a schematic cross-sectional view of the delayed unlocking push-down type emergency door-locking device along line C-C of FIG. 9.

Referring FIG. 7 to FIG. 10; where FIG. 7 illustrates schematically the position relationship diagram of partial components of the delayed unlocking push-down type emergency door-locking device of FIG. 1 when the handle is pushed down by an operator, FIG. 8 illustrates schematically the position relationship diagram of partial components of the delayed unlocking push-down type emergency door-locking device of FIG. 1 when the stopper moves to the avoidance position after the counted time reaches the predetermined delay time, FIG. 9 illustrates schematically the state of the delayed unlocking push-down type emergency door-locking device of FIG. 1 at a controlled unlock state after being assembled behind the emergency door, and FIG. 10 is a schematic cross-sectional view of the delayed unlocking push-down type emergency door-locking device along line C-C of FIG. 7. In the meanwhile, please refer now to FIG. 1 to FIG. 5 together.

When the controller 612 is at the (delayed unlocking) function-on state and the first handle 31, the second handle 32 or the push-down horizontal bar 33 of the push-down type handle assembly 3 are pushed down by an operator, then the first drive portion 311 of the first handle 31 would be separated from a locking position LP of FIG. 3 and would be no longer to contact the first micro-switch sensor 51 with pressure. At this time, the stopper 4 in the stop position SP is contacted by the first drive portion 311 of the first handle 31. It prevents the first drive portion 311 of the first handle 31 from continuing moving along a driving path DP toward an unlocking position ULP of FIG. 10 from the locking position LP of FIG. 3 in order to prevent from unlocking.

According to the fire regulations of different countries, a manager can set a predetermined delay time of the timer 613, usually between 15 and 30 seconds. While the first drive portion 311 of the first handle 31 leaves off the locking position LP, the first drive portion 311 would be no longer to contact the first micro-switch sensor 51 of the position-sensing module 5, or to change the depression of the micro-switch sensor 51. At this time, the first micro-switch sensor 51 of the position-sensing module 5 would sense that the left of the first handle 31 away from the locking position LP, and then an unlocking-triggering signal S2 would be transmitted to the controller 612. After that, the controller 612 transmits a timing signal S3 and an alarm signal S4.

When receiving the timing signal S3, the timer 613 counts time. After the counted time reaches the predetermined delay time, a timing-off signal S5 is sent back to the controller 612, so that the controller 612 generates a stopper pulling signal S6 and sends it to the electromagnetic traction mechanism 62. After the electromagnetic traction mechanism 62 receives the stopper pulling signal S6, the electromagnetic 621 of the electromagnetic traction mechanism 62 provides a magnetic force to pull the stopper 4 along a traction direction TD from the stop position SP to the avoidance position AP. The avoidance position AP is to avoid the driving path DP to allow the first drive portion 311 of the first handle 31 to continue moving along the driving path DP toward the unlocking position ULP.

After the stopper 4 is pulled by the electromagnetic traction mechanism 62 along the traction direction TD from the stop position SP to the avoidance position AP, the first drive portion 311 of the first handle 31 can move along the driving path DP toward the unlocking position ULP of FIG. 10 from the locking position LP of FIG. 3, and the second drive portion 321 of the second handle 32, being in a coherent manner with the first handle 31 as the above operation, moves along the driving path DP toward the unlocking position ULP from the locking position LP. While the second drive portion 321 of the second handle 32 is at the unlocking position ULP, the locking element 11 is separated from the locking grove LG to unlock.

After receiving the alarm signal S4, the buzzer 10 issues an alarm. After the buzzer 10 activates the alarm, if the alarm is to be cancelled, then the key 500 can be inserted into the key hole KH to further rotate the delayed unlocking function switch lock 7, such that the protrusion 71 of the delayed unlocking function switch lock 7 would be switched back to the function-disable position FDP from the function-enable position FEP. At this time, the protrusion 71 can rotate the lever 8 without touching the second micro-switch sensor 91, such that the second micro-switch sensor 91 would detect that the protrusion 71 of the delayed unlocking function switch lock 7 is at the function-disable position FDP, and a function-off signal S7 would be formed and transmitted to the controller 612 for the controller 612 to enter the function-off state again. Also, an alarm clear signal S8 would be generated and transmitted to the buzzer 10 for the buzzer 10 to terminate the alarm.

In summary, since the delayed unlocking push-down type emergency door-locking device 100 provided in the present invention utilizes the position-sensing module 5 disposed inside the secondary lock seat 2 to sense if the first handle 31 is separated from the locking position LP, such that whether or not the delayed unlocking function to be activated can be determined. After the predetermined delay time is reached, the stopper 4 is pulled to move to the avoidance position AP, so that the push-down type handle assembly 3 can move along the driving path DP toward the unlocking position ULP from the locking position LP to delay unlocking.

In addition, since all the elements related to the delayed unlocking means (including the stopper 4, the position-sensing module 5 and the timing electromagnetic traction assembly 6) are disposed inside the secondary lock seat 2, and all the mechanisms related to the locking/unlocking are also disposed inside the main lock seat 1, thus functions of automatic sensing and delayed unlocking can be fulfilled without changing internal locking/unlocking mechanisms of the main lock seat 1. Accordingly, the applications can be common for a variety of existing push-down type emergency door-locking devices, and thus the push-down type emergency door-locking device originally without the delayed unlocking function can be upgraded to have the delayed unlocking function. Thereby, preparation and installation costs of the components related to the sensing and delayed unlocking can be substantially reduced.

While the present invention has been particularly shown and described with reference to a preferred embodiment, it will be understood by those skilled in the art that various changes in form and detail may be without departing from the spirit and scope of the present invention.

What is claimed is:

1. A delayed unlocking push-down type emergency door-locking device, disposed at a door board, the door board including a locking side neighboring to a locking groove, comprising:

- a main lock seat, disposed by neighboring to the locking side of the door board, having at least one locking element;
- a secondary lock seat, disposed by being away from the locking side of the door board than the main lock seat;
- a push-down type handle assembly, including:
  - a first handle, connected pivotally with the secondary lock seat, configured for being controlled to move pivotally toward an unlocking position along a driving path from a locking position;
  - a second handle, connected pivotally with the main lock seat, configured for being controlled to move with the first handle along the driving path; wherein, while at the locking position, the at least one locking element is buckled with the locking groove; wherein, while at the unlocking position, the at least one locking element is separated from the locking groove; and
  - a push-down horizontal bar, bridging the first handle and the second handle so as to have the second handle and the first handle to be connected in a coherent manner;
- a stopper, disposed at the secondary lock seat, controlled for moving between a stop position and an avoidance position; wherein the stop position is for blocking the driving path, and the avoidance position is for avoiding the driving path;
- a position-sensing module, disposed at the secondary lock seat, configured for sensing whether or not the first handle has been separated from the locking position, and transmitting an alarm-triggering signal if positive; and
- a timing electromagnetic traction assembly, disposed at the secondary lock seat, including:
  - a timing controller, electrically connected with the position-sensing module, configured for counting time after the unlocking-triggering signal is received in a function-on state, configured for issuing a stopper pulling signal after the counted time reaches a predetermined delay time; and
  - an electromagnetic traction mechanism, electrically connected with the timing controller and connected with the stopper, for pulling the stopper from the stop position to the avoidance position after the stopper pulling signal is received;
  - whereby the second handle moves along the driving path to the unlocking position to delay unlocking.

2. The delayed unlocking push-down type emergency door-locking device of claim 1, wherein the first handle includes:

- a first drive portion, disposed inside the secondary lock seat; and
- a first operation portion, extending out of the secondary lock seat from the first drive portion, connected fixedly with the push-down horizontal bar.

3. The delayed unlocking push-down type emergency door-locking device of claim 2, wherein the second handle includes:

- a second drive portion, disposed inside the main lock seat; and
- a second operation portion, extending out of the main lock seat from the second drive portion, connected fixedly with the push-down horizontal bar.

4. The delayed unlocking push-down type emergency door-locking device of claim 1, wherein the position-sensing module includes a first micro-switch sensor for generating the unlocking-triggering signal upon when it is detected that the first handle is separated from the locking position.

5. The delayed unlocking push-down type emergency door-locking device of claim 1, wherein the electromagnetic traction mechanism includes an electromagnet, for providing a magnetic force that pulls the stopper from the stop position to the avoidance position after the stopper pulling signal is received; whereby the second handle moves along the driving path toward the unlocking position for unlocking.

6. The delayed unlocking push-down type emergency door-locking device of claim 1, wherein the timing controller includes:

- a circuit board, disposed inside the secondary lock seat;
- a controller, disposed at the circuit board, electrically connected with the position-sensing module, configured for generating a timing signal after the unlocking-triggering signal is received in the function-on state; and
- a timer, electrically connected with the controller, configured for counting time after the timing signal is received in the function-on state, and configured for issuing a timing-off signal after the counted time reaches the predetermined delay time;

whereby the controller issues the stopper pulling signal.

7. The delayed unlocking push-down type emergency door-locking device of claim 6, further including: a buzzer, electrically connected with the controller, the controller further generating an alarm signal after the unlocking-triggering signal is received in the function-on state, the controller transmitting the alarm signal to the buzzer to enable the buzzer to issue an alarm.

8. The delayed unlocking push-down type emergency door-locking device of claim 7, further including:

a delayed unlocking function switch lock, disposed inside the secondary lock seat, driven by a key to move between a function-enable position and a function-disable position; and an on/off position-detecting module, disposed at the secondary lock seat, electrically connected with the controller, configured for transmitting a function-on signal to the controller for the controller to enter the function-on state upon when the delayed unlocking function switch lock is detected to be at the function-enable position, and for transmitting a function-off signal to the controller for the controller to enter a function-off state upon when the delayed unlocking function switch lock is detected to be at the function-disable position, and then transmitting an alarm clear signal to the buzzer for terminating the alarm.

9. The delayed unlocking push-down type emergency door-locking device of claim 8, wherein the on/off position-detecting module includes a second micro-switch sensor for detecting that the delayed unlocking function switch lock is at the function-enable position or the function-disable position.

10. The delayed unlocking push-down type emergency door-locking device of claim 9, further including a lever, the lever being disposed inside the secondary lock seat and driven by the delayed unlocking function switch lock; wherein, upon when the delayed unlocking function switch lock is at the function-enable position, the second micro-switch sensor is triggered to have the second micro-switch sensor to detect that the delayed unlocking function switch lock is at the function-enable position.

11. The delayed unlocking push-down type emergency door-locking device of claim 1, wherein the stopper includes an avoidance groove, the stopper allowing the first handle moves through the avoidance groove and along the driving path when the stopper is located at the avoidance position.

* * * * *